C. W. TAYLOR.
POWER TRANSMISSION MECHANISM.
APPLICATION FILED NOV. 18, 1912.

1,057,466.

Patented Apr. 1, 1913.

Witnesses:
Milton Lenair
L. B. Graham

Inventor.
Clarence W. Taylor

UNITED STATES PATENT OFFICE.

CLARENCE W. TAYLOR, OF CHICAGO, ILLINOIS, ASSIGNOR TO AGNES POAGE TAYLOR, OF CHICAGO, ILLINOIS.

POWER-TRANSMISSION MECHANISM.

1,057,466.     Specification of Letters Patent.     Patented Apr. 1, 1913.

Application filed November 18, 1912. Serial No. 731,934.

*To all whom it may concern:*

Be it known that I, CLARENCE W. TAYLOR, a citizen of the United States, residing at Chicago, in the county of Cook and State of Illinois, have invented certain new and useful Improvements in Power-Transmission Mechanism, of which the following is a specification.

My invention relates to improvements in power transmission mechanism and the objects of my improvement when applied to a motor vehicle are,—First. To provide simple, effective and quick acting devices for automatic coupling of a rotatable part or housing connected with differential gearing with both parts of a divided shaft for power transmission in one direction and instant release of either or both parts of the divided shaft from such rotatable housing without manual effort to permit either or both vehicle wheels to run relatively faster when the wheel "mounts an obstruction or drops into a declivity" or describes a longer radius curve, or the vehicle coasts. Second. To afford a positive two-wheel drive in one direction by slight alteration and addition to present automobile and truck construction and the employment of the ordinary differential gear. Third. The provision of automatically operable means to prevent differential action of the differential mechanism excepting when one or both vehicle wheels run faster in the direction of rotation of the vehicle than the driver.

With the foregoing and other objects in view, my invention consists in the novel features and in the novel combination and arrangement of parts hereinafter fully described, illustrated in the accompanying drawings forming a part of this specification, and particularly pointed out in the claims hereunto appended, it being understood that changes, variations and modifications in the details of the invention within the scope of the claims, may be resorted to without departing from the spirit or sacrificing any of the advantages thereof, hence I do not confine myself to the exact construction and arrangement of parts shown and described.

Figure 1:
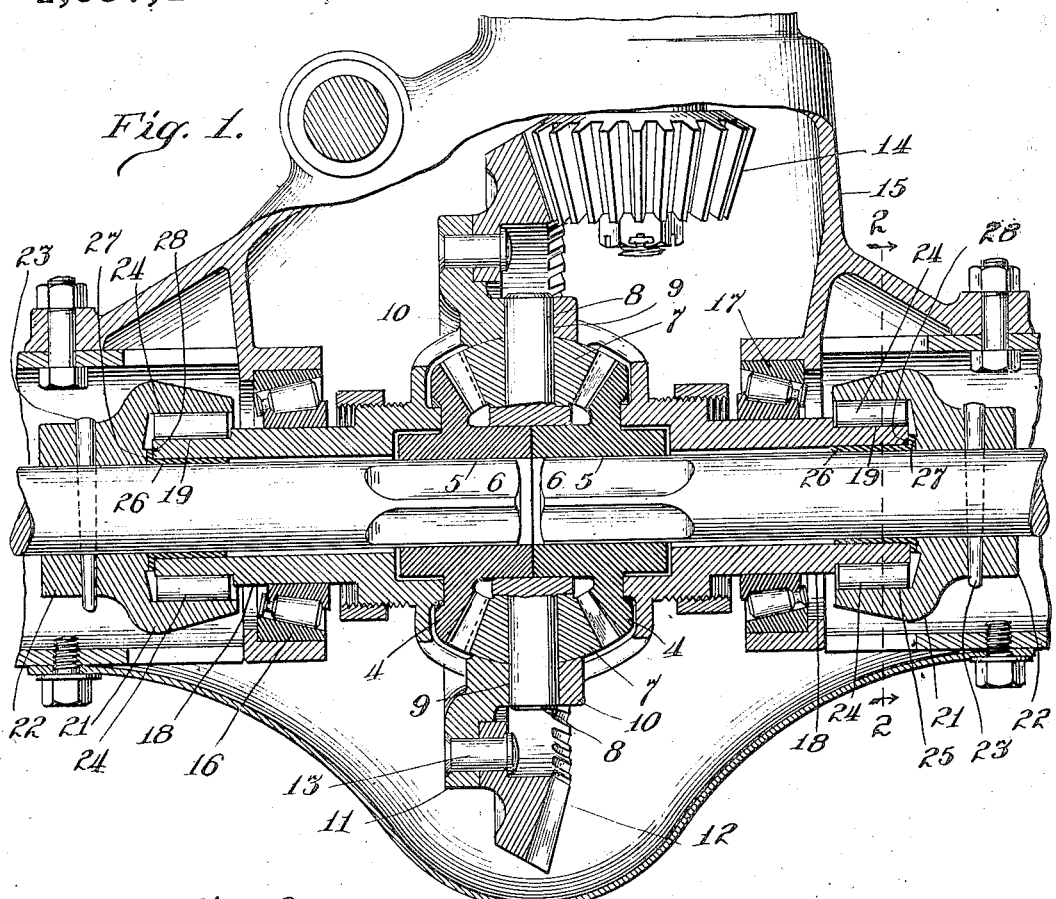
Figure 2:
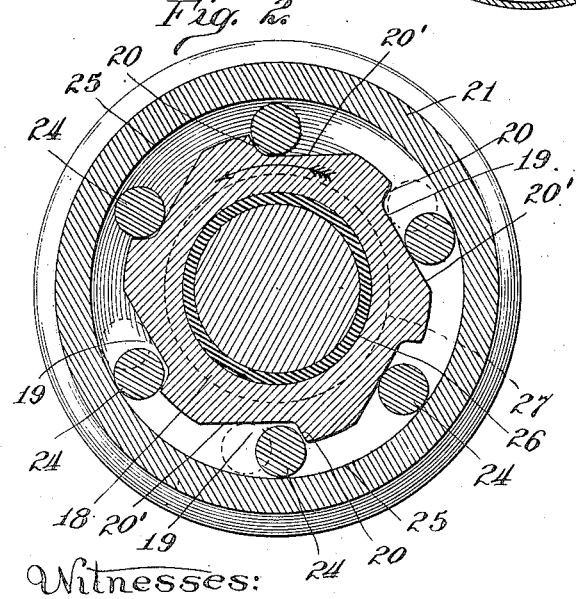
Figure 3:
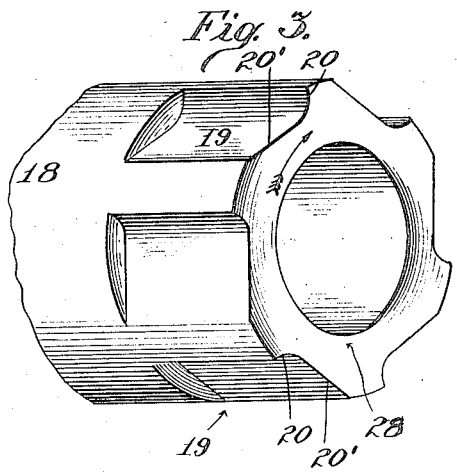

Figure 1 is a horizontal central section of a rear axle of the Timken floating type for motor vehicles with the ordinary bevel gear differential driving mechanism with my improvement incorporated therewith. Fig. 2 is a cross section on line 2 2 in Fig. 1. Fig. 3 is a perspective of one end of the rotatable housing which is connected with the differential gearing.

Similar numerals refer to similar parts throughout the several views.

One embodiment of my invention is assembled in a Timken rear axle of a motor vehicle with the ordinary differential mechanism and shaft drive. It will be understood that in the case of chain drive a divided jack-shaft with rotatable housing for the differential mechanism is employed.

Obviously only the differential mechanism is employed when backing the vehicle.

Referring to the drawings by reference numerals, 4 designates two bevel-gear plates of equal diameters, with squared shaft-openings 5, and mounted on contiguous squared end-portions 6, of the divided shaft, designed to be revolved, and four bevel pinions 7 journaled radially between the two gear plates and meshing with them. The shafts 8 of the pinions extend radially outward into openings 9 in what is termed a driver or portion of a rotatable housing 10, which carries an outwardly extending annular flange 11 to which is fixed a bevel gear wheel 12 by rivets 13. The pinion 14 in mesh with the gear wheel 12 is fixed to the drive shaft (not shown). The non-rotatable housing 15 affords the usual bearings 16 and 17 for the rotatable housing 10. Motion transmitted to the housing 10, holding the outer ends of the pinion shafts, causes both bevel-gear plates to revolve equally, unless one resists more than the other, in which case the small pinions revolve and permit the plate which moves easier to move farther.

For the purpose of automatically connecting the housing 10 at each end with one part of the divided shaft, I have formed both outer end-portions of the housing 10 with a one-way friction ratchet member 18 having several roller-recesses 19, each provided with a limiting wall 20 and inclined plane 20'. Adjacent the ratchet member and coöperating therewith is disposed a drum 21 opening inwardly and having a hub portion 22 suitably fixed to the shaft 6 by pin 23.

The inclined bottom of the recess 19 wedges a roller or ball 24 into frictional adherence with the inner face 25 of the drum 21, and causes the housing and the shaft to revolve together. As soon as the direction of rotation of the housing is reversed the rollers are instantly freed from their contact. When the speed of one or both vehicle wheels exceeds that of the housing the rollers are promptly released from power transmission engagement with the drum.

Between the shaft 6 and each outer end of the housing 10 there is placed a bushing 26 having an external annular flange 27, which flange serves as a thrust bearing between the end 28 of the housing and the inner wall of the hub of the drum 21.

It will be noticed the present form of means for engagement between the driver and the driven shaft gives a radial instead of a longitudinal strain. This is the preferred construction. The respective ends of the rotatable housing and the two clutch members fixed to the two parts of the divided shaft constitute two clutches.

By my present construction, combination and arrangement of parts, I afford a positive two-wheel forward drive in motor-vehicle and instant differential action of either or both rear vehicle wheels with but slight addition to and change of the ordinary differential mechanism and parts of the divided shaft. I have thus avoided the objection urged against some forms of manually operated devices for locking and unlocking the differential, namely, that "no human intelligence is sufficient for the task of unlocking the differential at the scientifically correct moment," and that "any moment less than the scientifically correct makes the lock too dangerous for a careful manufacturer to sell to a confiding customer."

Having thus fully described my invention, what I claim as new, and desire to secure by Letters Patent, is,—

1. In a power transmission mechanism, the combination of a divided shaft, differential gearing connecting the opposing ends of the divided shaft, a clutch member fixed to each portion of the divided shaft, a rotatable housing in operative engagement with the differential gearing, said housing having its opposite ends suitably formed to constitute members of clutches for one-way power transmitting engagement with the clutch members fixed to the respective portions of the divided shaft, a plurality of rollers between the members of the respective clutches, and means to rotate the housing.

2. In power transmission mechanism, the combination of a divided shaft, differential gearing connecting the opposing ends of the divided shaft, a rotatable housing in operative relation with the differential gearing, and a plurality of one-way clutches each comprising a member fixed to one part of the divided shaft and an adjacent end of the rotatable housing constituting the other clutch member, and rollers disposed between the members of the respective clutches to cause the shafts and the housing to rotate together in one direction and to permit either shaft to instantly disengage from the rotatable housing without manual effort and rotate faster in a forward direction than the housing.

3. In power transmission mechanism, the combination of a divided shaft, differential gearing connecting the opposing ends of the divided shaft, a rotatable housing in operative engagement with the differential gearing, means for rotating the housing, and a plurality of one-way clutches each comprising a member fixed to one part of the divided shaft and an adjacent end of the rotatable housing and means therebetween to cause the shafts and the housing to rotate together and to permit either shaft to instantly disengage from the housing without manual effort and rotate faster in a forward direction than the housing.

In testimony whereof I affix my signature in presence of two witnesses.

CLARENCE W. TAYLOR.

Witnesses:
C. RICHARD BETTS,
SCOTT M. HOGAN.